United States Patent Office 3,284,247
Patented Nov. 8, 1966

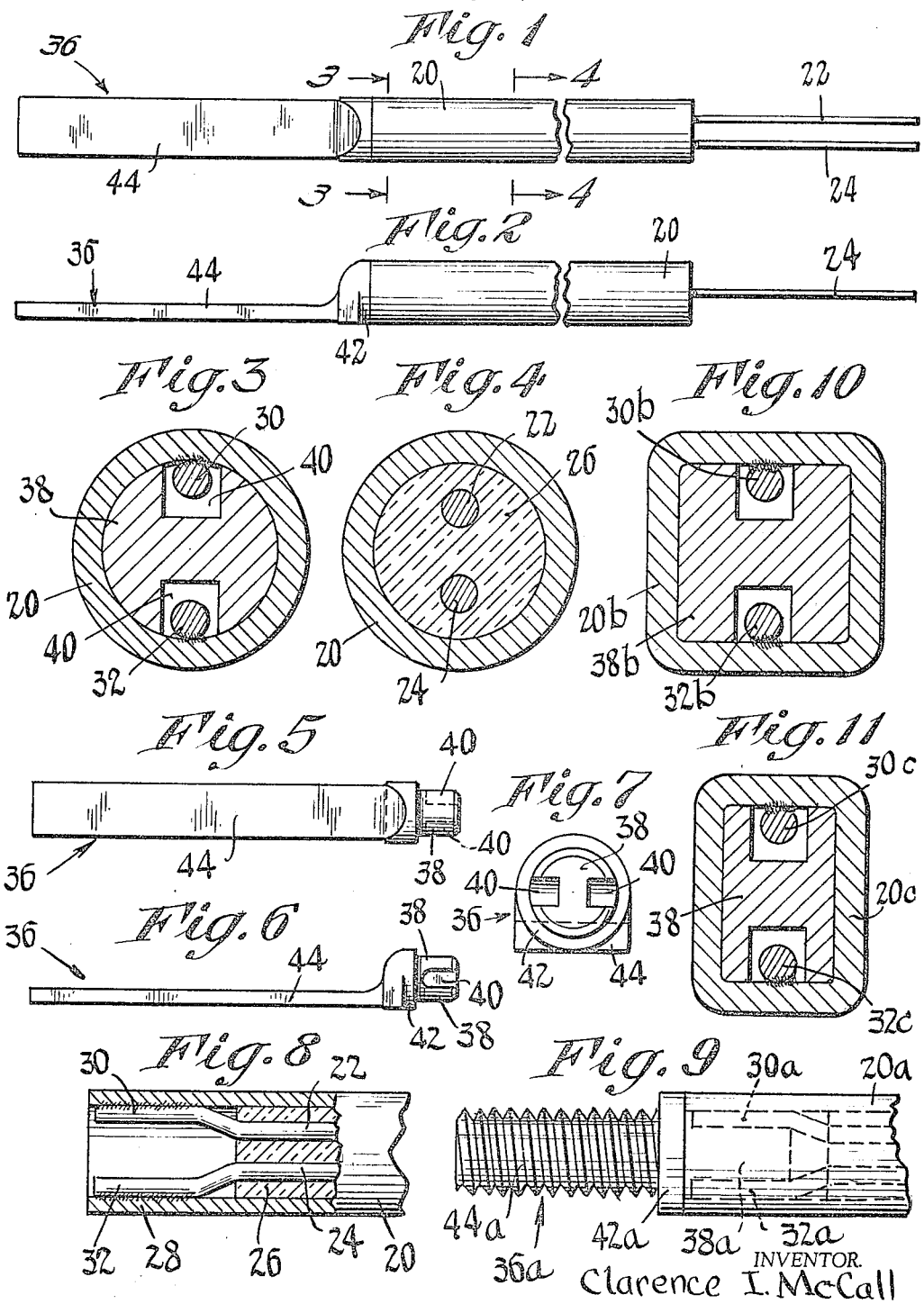

3,284,247
THERMOCOUPLE PROBE CONSTRUCTION
Clarence I. McCall, Waterbury, Conn., assignor to Lewis Engineering Company, Naugatuck, Conn., a corporation of Connecticut
Filed July 15, 1963, Ser. No. 295,066
6 Claims. (Cl. 136—233)

This invention relates to thermocouple probes, and more particularly to the hot juncture or tip structures thereof.

The present invention overcomes welding and assembly difficulties heretofore experienced in producing thermocouple tips, and one object of the invention is to provide a novel and improved thermocouple tip structure which may be readily fabricated utilizing well known welding techniques, characterized by a minimum likelihood of defects or faults occurring during the fabrication.

Another object of the invention is to provide an improved thermocouple tip structure in accordance with the foregoing, wherein a secure closure of the tubular sheath member is had, thereby to obtain an effective retention of the insulating materials.

A further object of the invention is to provide an improved thermocouple tip structure as above characterized, wherein successful welding of the elements may be carried out in an area closely adjacent the insulating material without interference from the latter, thereby minimizing the possibility of gassing of materials and formation of voids or pockets in the insulation, poor or incomplete welds, etc.

A feature of the invention resides in the provision of an improved thermocouple tip as above set forth, which involves relatively few parts of simple structure, whereby it may be economically fabricated.

Another feature of the invention resides in the provision of an improved thermocouple tip structure which is exceptionally reliable in operation under adverse conditions and over an extended period of use.

Other features and advantages will hereinafter appear.

In the drawing accompanying this specification, similar characters of reference are used to designate like components throughout the several views, in which:

FIG. 1 is a top plan view on an enlarged scale, showing the thermocouple probe and tip construction as provided by the invention.

FIG. 2 is a side elevational view of the thermocouple probe and tip construction of FIG. 1.

FIG. 3 is a transverse section taken on the line 3—3 of FIG. 1.

FIG. 4 is a transverse section taken on the line 4—4 of FIG. 1.

FIG. 5 is a top plan view of a thermocouple tip member as provided by the invention.

FIG. 6 is a side elevational view of the tip member of FIG. 5.

FIG. 7 is an elevational view of the inner end of the tip member of FIGS. 5 and 6.

FIG. 8 is a fragmentary view partly in axial section and partly in elevation, showing a welded tip construction as provided by the invention, prior to the assembly of the closure or tip member thereto.

FIG. 9 is a top plan view of another tip construction as provided by the invention, illustrating a modification thereof.

FIG. 10 is a transverse sectional view (comparable to that of FIG. 3) through a tip structure illustrating another modification of the invention.

FIG. 11 is a transverse sectional view comparable to that of FIGS. 3 and 10, illustrating yet another modification of the invention.

Referring first to FIGS. 1–8, the thermocouple probe and tip construction illustrated therein comprises an elongate tubular sheath 20 which may be constituted of stainless steel or other suitable material, the said sheath having any desired practical length as determined by the requirements of the particular installation. Within the sheath 20 are thermocouple elements or wires 22, 24 constituted of suitable material such as chromium and aluminum metal alloys. For example, the wires 22, 24 may be of the alloys known commercially as "Chromel" and "Alumel" (registered tradenames). The thermocouple wires 22, 24 are in spaced parallel relation, being supported by the usual insulation 26 of magnesium oxide (MgO).

At the remote tip portion 28 of the sheath 26 the magnesium oxide insulation 26 is removed for a distance, exposing the corresponding remote ends of the thermocouple wires 22, 24.

In accordance with the present invention, the hot junction or tip portion of the thermocouple is constituted by welding the remote ends of the wires 22, 24 to the interior of the tip portion 28 of the sheath 20. For this purpose, as seen in FIG. 8, the tip portions 30, 32 of the wires 22, 24 respectively are offset outward to bring them into engagement with the interior wall surface of the sheath tip portion 28, and the said offset tip portions are then securely spot welded to the inside of the sheath.

I have found that such spot welding or securement of the wires to the sheath not only effects a permanent and reliable assemblage and hot juncture, but also that such welding may be readily carried out by known techniques without difficulty or interference due to the proximity of the insulation 26. After the initial removal of the end portion of the insulation as shown in FIG. 8, the end portions of the wires 22, 24 may be readily formed with the offsets shown by a suitable tool. Subsequent to such formation, any loose particles of insulation which might exist may be shaken out or otherwise disposed of. Thereafter, the welding process may be carried out without further regard to the presence of the insulation, and the above procedure is of considerable advantage in that there is eliminated the likelihood of gassing and voids, as where insulating material comes in contact with a molten welding puddle or the like.

Heretofore, accidental contact between the weld and the insulation, all of which have resulted in an imperfect product-perfect welds, and has caused undesirable voids in the insulator, all of which have resulted in an imperfect product. These prior difficulties are obviated, in accordance with the present invention, by means of the above procedure and construction.

Further, in accordance with the invention, after the offsetting and welding of the tip portions of the wires has been effected, there is applied to such assemblage a novel metal closure member of stainless steel or other suitable material, which is welded in place and which provides a secure stopper or seal. The closure member is illustrated by itself in FIGS. 5, 6 and 7, being designated by the numeral 36. The member 36 comprises a short shank portion 38 having oppositely disposed grooves or notches 40 arranged to provide clearance for the welded end portions 30, 32 of the thermocouple wires. The closure or tip member 36 additionally has an annular flange 42 having a diameter which is commensurate with the outside diameter of the sheath 20. Beyond the flange 42, the tip portion has an elongate tongue or blade 44 which constitutes the contacting element of the tip member.

As seen in FIGS. 1–3, the tip member 36 is applied by inserting the shank 38 in the end of the sheath 20 so that the welded wire portions 30, 32 are accommodated in the notches 40. The flange 42 of the tip member 36 is then welded to the edge of the tubular sheath 20 by a suitable procedure, as for example utilizing an electron beam process. The completed tip structure then appears as depicted in FIGS. 1 and 2.

The welding of the flange 42 to the tip portion 28 of the sheath 20 occurs at a point which is remote from the insulation 26, whereby there is again avoided any likelihood of gassing of the insulation, formation of voids therein, or interference with the welding of the flange. The weld extends for the full circumference of the flange and sheath, thereby providing a complete seal at the tip end of the sheath.

It is seen that the shank 38 of the tip member 36 is integral and in good heat-conducting relation with the contact blade or tongue 44 whereby heating of the latter will quickly raise the temperature of the shank to a value not greatly different from the blade. Also, the shank 38 has large areas in contact with the inner wall surfaces of the sheath tip portion 28, such contact existing at the opposite sides of each of the offset wire portions 30, 32. The said area of contact is roughly along an arc on the order of 120°, and is appreciably in excess of a right angle. Such large area of contact will result in heat being quickly transmitted to the tip portion 28 of the sheath 20 from the blade 44 of the tip member 36. In consequence, a relatively rapid response of the hot junction is had to temperature changes of the blade 44, and this is an important feauture of the invention.

The complete sealing of the tip portion 28 of the sheath 20 effectively prevents any particles of the insulation 26 from leaving the sheath 20. Moreover, the presence of the shank 38 of the tip member 36 confines any such loose particles and helps to maintain the initial formation which has been given to the insulation at the time that the wire elements 22, 24 were assembled to the sheath 20.

It will now be understood from the foregoing that there has been provided by the invention a simple yet improvide and highly effective and reliable thermocouple tip construction having advantages as above explained. The tip construction may be fabricated by known welding procedures and equipment, without difficulty and without giving rise to defects which would cause rejection of the finished product.

Another embodiment of the invention is illustrated in FIG. 9, wherein a sheath 20a having welded offset wire portions 30a, 32a is provided with a tip member 36a having a shank 38a and external screw threads 44a beyond the welded shoulder 42a. Welded offset wire portions 30c and 32c are shown. With such tip member the well which receives the thermocouple can have a threaded socket into which the threads 44a may be received. This can effect a better heat-conduction to the tip member while at the same time tending to minimize vibration or relative movement of the member when in its operative position. The other advantages of the thermocouple tip construction attributed to the embodiment of FIGS. 1-8 are also present in the construction of FIG. 9.

While in FIGS. 1-9 the sheath 20 or 20a is described as having a cylindrical configuration, other configurations such as a square section or a rectangular section are also possible. In FIG. 10, the sheath 20b is shown as having a square section, and the shank 38b of the tip member is shown as correspondingly square in section.

In FIG. 11 the sheath 20c is shown as having a rectangular cross section, and the shank 38c of the tip member is shown as being correspondingly rectangular. The welded offset wires are 30c and 32c. In each instance, the shank is provided with clearance notches to accommodate the offset welded wire ends, which latter are designated respectively 30b, 32b in FIG. 10 and 30c, 32c in FIG. 11. The structures of FIGS. 10 and 11 have the advantages enumerated above in connection with the construction of FIGS. 1-8.

While several different embodiments of the invention have been illustrated and described herein, it is apparent that the invention is not limited to the specific structures illustrated, but that instead variations and modifications may be made within the scope of the claims, and portions of the improvement may be made without others.

I claim:

1. A thermocouple probe construction comprising, in combination:
   (a) a tubular metal sheath of finite length, having a tip portion adapted to be subjected to heat,
   (b) a pair of thermocouple wires disposed and extending lengthwise in the sheath, corresponding end portions of the wires being welded to the interior of said tip portion at two spaced and different locations, and
   (c) a tip member welded to and extending into the tip portion of the sheath, said member closing the tip portion of the sheath and having cavity formations to provide clearance for the welded ends of the wires.

2. A thermocouple probe construction as in claim 1, wherein:
   (a) the tip member has a flat, strip-like integral extension having a width commensurate with the width of the sheath.

3. A thermocouple probe construction as in claim 1, wherein:
   (a) the tip member has a screw-threaded integral axial extension having a maximum diameter commensurate with the width of the sheath.

4. A thermocouple probe construction as in claim 1, wherein:
   (a) the sheath is of circular cross section and
   (b) the said different locations are diametrically opposite each other.

5. A thermocouple probe construction as in claim 1, wherein:
   (a) the sheath is of right-angled cross section and
   (b) the said different locations are opposite each other.

6. A thermocouple probe construction as in claim 1, wherein:
   (a) the end portions of the wires are laterally offset from the remainders of the wires,
   (b) there is an insulating tube in the sheath, through which the remainders of the wires pass,
   (c) the tip member has an outer peripheral surface in intimate contact with and good heat-conducting relation to the inner wall portions of the tip portion of the sheath
   (d) the tip member has an external annular flange which is welded to and which abuts the entire end edge of the tip portion of the sheath,
   (e) the said tip member has an elongated intnegral longitudinal extension which is in good heat-conducting relation to the annular flange, said extension being adapted for engagement with a member of elevated temperature,
   (f) the outer peripheral surface of the tip member and the contacted inner wall portions of the sheath engage each other through an arc of more than 180°,
   (g) the inner wall portions of the sheath at opposite sides of each of the wire ends and adjoining the same being engaged by the said tip member to receive heat therefrom.

References Cited by the Examiner

UNITED STATES PATENTS

| | | | |
|---|---|---|---|
| 3,048,641 | 8/1962 | Erlebacher | 136—5 X |
| 3,055,961 | 9/1962 | Robertson | 136—4 |
| 3,143,439 | 8/1964 | Hansen | 136—4 |

WINSTON A. DOUGLAS, *Primary Examiner.*

A. B. CURTIS, *Assistant Examiner.*